United States Patent
Douglas et al.

(10) Patent No.: US 11,810,123 B1
(45) Date of Patent: Nov. 7, 2023

(54) SYSTEM AND METHOD FOR CARD PRESENT ACCOUNT PROVISIONING

(71) Applicant: Capital One Services, LLC, McLean, VA (US)

(72) Inventors: Lawrence Douglas, McLean, VA (US); Jeffrey Rule, Chevy Chase, MD (US); Jackson Macomber, Henrico, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/740,966

(22) Filed: May 10, 2022

(51) Int. Cl.
*G06Q 20/42* (2012.01)
*G06Q 20/40* (2012.01)
*G06Q 20/20* (2012.01)

(52) U.S. Cl.
CPC .......... *G06Q 20/425* (2013.01); *G06Q 20/20* (2013.01); *G06Q 20/40145* (2013.01); *G06Q 20/40975* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 7,146,159 B1 * | 12/2006 | Zhu | G06Q 40/03 235/382 |
| 8,639,629 B1 | 1/2014 | Hoffman | |
| 9,400,888 B1 * | 7/2016 | Banthia | H04W 52/0229 |
| 9,516,487 B2 * | 12/2016 | Powell | H04M 15/8044 |
| 9,699,594 B2 * | 7/2017 | Sarkar | H04W 12/35 |
| 9,760,871 B1 * | 9/2017 | Pourfallah | G06Q 20/405 |

(Continued)

FOREIGN PATENT DOCUMENTS

| | | | | |
|---|---|---|---|---|
| CA | 2990119 A1 * | 6/2018 | | G06Q 20/3226 |
| CN | 113196813 A * | 7/2021 | | G06F 21/121 |

(Continued)

OTHER PUBLICATIONS

W. Liu, X. Wang and W. Peng, "State of the Art: Secure Mobile Payment," in IEEE Access, vol. 8, pp. 13898-13914, 2020. https://ieeexplore.ieee.org/stamp/stamp.jsp?tp=&arnumber=8947955 (Year: 2020).*

(Continued)

*Primary Examiner* — El Mehdi Oussir
(74) *Attorney, Agent, or Firm* — HUNTON ANDREWS KURTH LLP

(57) ABSTRACT

In a method for provisioning account information of a payment card, user datum encryption information is transmitted to a transaction data processing system. A user datum encrypted using the user datum encryption information and a request to share account provisioning information is received from the transaction data processing system when the payment card is present by a user at the transaction data processing system. A user account associated with the payment card is determined and the user of the payment card is authenticated. A request for confirmation that the account provisioning information should be shared is sent to a user device associated with the user account and a confirmation response is received from the user device that includes permission to share account provisioning information. Account provisioning information is then transmitted to the transaction data processing system.

20 Claims, 7 Drawing Sheets

(56) References Cited

U.S. PATENT DOCUMENTS

| | | | |
|---|---|---|---|
| 9,805,370 B1* | 10/2017 | Quigley | H04W 12/033 |
| 10,346,848 B2* | 7/2019 | Ziat | G06Q 20/227 |
| 10,433,128 B2* | 10/2019 | Sheets | H04W 4/50 |
| 10,461,933 B2 | 10/2019 | Le Saint et al. | |
| 10,664,824 B2* | 5/2020 | Wong | G06Q 20/322 |
| 10,839,371 B1* | 11/2020 | Vukich | G06Q 20/3224 |
| 10,963,589 B1* | 3/2021 | Fakhraie | H04L 63/101 |
| 10,970,707 B1* | 4/2021 | Techel | G06Q 20/36 |
| 10,992,606 B1* | 4/2021 | Mitchell | H04L 9/3231 |
| 10,992,679 B1* | 4/2021 | Fakhraie | H04L 63/101 |
| 11,010,766 B1* | 5/2021 | Duke | G06Q 20/405 |
| 11,055,683 B1* | 7/2021 | Bartholomew | G06Q 20/341 |
| 11,062,388 B1* | 7/2021 | Pearce | H04L 63/102 |
| 11,087,328 B2* | 8/2021 | Carpenter | G06Q 20/322 |
| 11,100,495 B1* | 8/2021 | Duke | G06Q 20/382 |
| 11,121,590 B1* | 9/2021 | Patel | H04B 5/0037 |
| 11,170,379 B2* | 11/2021 | Cash | G06Q 20/3821 |
| 11,188,887 B1* | 11/2021 | Limaye | G06Q 20/385 |
| 11,201,743 B2 | 12/2021 | Le Saint et al. | |
| 11,295,308 B1* | 4/2022 | Fortney | G06Q 20/4012 |
| 11,386,223 B1* | 7/2022 | Fakhraie | G06F 9/547 |
| 11,386,421 B2* | 7/2022 | Kumar | G06Q 20/3256 |
| 11,403,630 B2* | 8/2022 | Dua | G06Q 20/40 |
| 11,429,975 B1* | 8/2022 | Asefi | G06Q 20/3821 |
| 11,587,053 B1* | 2/2023 | Macomber | G06Q 20/352 |
| 11,651,300 B2* | 5/2023 | Navin | G06Q 20/385 |
| | | | 705/75 |
| 2013/0275309 A1* | 10/2013 | Kwong | G06Q 20/4012 |
| | | | 348/78 |
| 2014/0108263 A1 | 4/2014 | Ortiz et al. | |
| 2015/0095219 A1* | 4/2015 | Hurley | G06Q 20/382 |
| | | | 705/39 |
| 2016/0162882 A1 | 6/2016 | McClung | |
| 2016/0218875 A1* | 7/2016 | Le Saint | H04L 9/0825 |
| 2017/0053283 A1* | 2/2017 | Meng | G06Q 20/102 |
| 2017/0177808 A1* | 6/2017 | Irwin | G16H 40/63 |
| 2017/0177809 A1* | 6/2017 | Bull | G16H 50/30 |
| 2017/0178093 A1* | 6/2017 | Bull | G06Q 20/227 |
| 2017/0178135 A1* | 6/2017 | Bull | G06Q 20/40 |
| 2017/0178245 A1* | 6/2017 | Rodkey | G06Q 30/0202 |
| 2018/0089647 A1* | 3/2018 | Sadiq | G06Q 20/045 |
| 2018/0240101 A1* | 8/2018 | Chan | G06Q 20/3224 |
| 2018/0336543 A1* | 11/2018 | Van Os | G06Q 20/102 |
| 2018/0336553 A1* | 11/2018 | Brudnicki | G06Q 20/3821 |
| 2019/0122212 A1* | 4/2019 | Huxham | G06Q 20/3227 |
| 2019/0213578 A1* | 7/2019 | Reijkens | G06Q 20/353 |
| 2020/0007536 A1* | 1/2020 | Piel | H04L 63/102 |
| 2020/0034830 A1* | 1/2020 | Ortiz | G06Q 20/227 |
| 2020/0097960 A1* | 3/2020 | Wong | G06Q 20/3821 |
| 2020/0160323 A1 | 5/2020 | Ledwell et al. | |
| 2021/0012401 A1* | 1/2021 | Osborn | G06Q 20/3278 |
| 2021/0150616 A1* | 5/2021 | Kentris | G06F 3/04842 |
| 2021/0174363 A1* | 6/2021 | Locke | G07F 7/0846 |
| 2021/0398115 A1* | 12/2021 | Newman | G06Q 20/38215 |
| 2021/0398205 A1* | 12/2021 | Rule | G06Q 20/409 |
| 2022/0245606 A1* | 8/2022 | Chauhan | G06Q 20/326 |

FOREIGN PATENT DOCUMENTS

| | | | | |
|---|---|---|---|---|
| EP | 3440803 B1 * | 3/2021 | | G06F 21/41 |
| EP | 3061056 B1 * | 12/2021 | | G06Q 20/20 |
| WO | 2012/126753 | 8/2012 | | |
| WO | 2013/157797 | 10/2013 | | |
| WO | WO-2015184114 A1 * | 12/2015 | | G06F 9/5061 |
| WO | WO-2016075530 A1 * | 5/2016 | | G06F 17/30227 |
| WO | WO-2021135206 A1 * | 7/2021 | | G06Q 20/0855 |

OTHER PUBLICATIONS

Smart Card ID: An Evolving and Viable Technology, https://pdfs.semanticscholar.org/ff61/d9795621e40557fd97e0d33692cde032a4d.pdf (Year: 2018).*

O. Zolotukhin and M. Kudryavtseva, "Authentication Method in Contactless Payment Systems," 2018 International Scientific-Practical Conference Problems of Infocommunications. Science and Technology (PIC S&T), Kharkiv, Ukraine, 2018, pp. 397-400. https://ieeexplore.ieee.org/document/8632065?source=IQplus.*

Zolotukhin et al. Authentication Method in Contactless Payment Systems. file:///C:/Users/eoussir/Documents/e-Red%20Folder/17740966/NPL2%20Authentication_Method_in_Contactless_Payment_Systems.pdf (Year: 2018).*

Notification of Transmittal of the International Search Report and the Written Opinion of the International Searching Authority issued in PCT/US2023/021449, dated Aug. 4, 2023, 10 pages.

* cited by examiner

SYSTEM AND METHOD FOR CARD PRESENT ACCOUNT PROVISIONING

FIELD OF THE INVENTION

This disclosure relates generally to systems and automated methods for user account provisioning and, more particularly to an automated system and method for card present account provisioning to a transaction data processing system.

BACKGROUND OF THE INVENTION

There are many instances where a user having a primary identification card, payment card, transaction card, or other primary account wishes to provide data relating to this primary account to administrators/processors of other accounts. Also the administrators/processors of other accounts (such as merchants) may wish to get the data relating to this primary account when a user of this primary account sets up the other accounts. When the other accounts are set up, the user generally is required to manually enter the card account provisioning information into the systems of the administrators/processors of other accounts, and at the same time, the administrators/processors of other accounts also need to perform some manual processes. Therefore, this approach still has the drawback that both the user of the card and the administrators/processors of other accounts must go through the entire manual process. The resulting process is not only time-consuming, it will also lower the willingness of both the user and the administrators/processors of other accounts to establish accounts that could benefit both.

SUMMARY OF THE INVENTION

An illustrative aspect of the invention provides a method for provisioning account information of a payment card by an account administrator data processing system to a transaction data processing system. The method may comprise transmitting, by the account administrator data processing system to the transaction data processing system, user datum encryption information; and receiving, by the account administrator data processing system from a payment terminal machine of the transaction data processing system, a user datum encrypted by the transaction data processing system using the user datum encryption information. The user datum is obtained through reading the payment card by the payment terminal machine. The method may further comprise receiving, by the account administrator data processing system from the payment terminal machine of the transaction data processing system, a request to share account provisioning information of a user account of the payment card associated with the encrypted user datum and administrated by the account administrator data processing system; determining, by the account administrator data processing system based on the encrypted user datum, the user account of the payment card is associated with the encrypted user datum; determining, by the account administrator data processing system, a user device associated with the user account of the payment card; authenticating, by the account administrator data processing system, a user of the payment card who is present at the payment terminal machine of the transaction data processing system; transmitting, by the account administrator data processing system to the user device, a message comprising a request for confirmation that the account provisioning information of the user account should be provisioned to the transaction data processing system; receiving, by the account administrator data processing system from the user device, a confirmation response including permission to provision to the transaction data processing system the account provisioning information of the user account; and transmitting, by the account administrator data processing system to the transaction data processing system, the account provisioning information of the user account.

Another aspect of the invention provides an automated system for provisioning account information of a payment card to a transaction data processing system. The system may comprise: a datum encryption data processor, a user account identification data processor, a user authentication data processor, a user confirmation data processor, and a provisioning information broadcast data processor. The datum encryption data processor is configured to: generate user datum encryption information; and transmit, over a first network to the transaction data processing system, the user datum encryption information. The user account identification data processor is configured to: receive, over the first network from a payment terminal machine of the transaction data processing system, a user datum encrypted by the transaction data processing system using the user datum encryption information, wherein the user datum is obtained through reading the payment card by the payment terminal machine; receive, over the first network from the payment terminal machine of the transaction data processing system, a request to share account provisioning information of a user account of the payment card associated with the encrypted user datum; determine, based on the encrypted user datum, the user account of the payment card is associated with the encrypted user datum; and determine a user device associated with the user account of the payment card. The user authentication data processor is configured to authenticate a user of the payment card who is present at the payment terminal machine of the transaction data processing system. The user confirmation data processor is configured to: transmit, over a second network to the user device, a message comprising a request for confirmation that the account provisioning information of the user account should be provisioned to the transaction data processing system; and receive, over the second network from the user device, a confirmation response including permission to provision to the transaction data processing system the account provisioning information of the user account. The provisioning information broadcast data processor is configured to transmit, over the first network, the account provisioning information of the user account.

Another aspect of the invention provides a non-transitory, computer readable medium comprising instructions for provisioning account information of a payment card to a transaction data processing system that, when executed on a data processing system, perform actions comprising transmitting, to the transaction data processing system, user datum encryption information; receiving, from a payment terminal machine of the transaction data processing system, a user datum encrypted by the transaction data processing system using the user datum encryption information, wherein the user datum is obtained through reading the payment card by the payment terminal machine; receiving, from the payment terminal machine of the transaction data processing system, a request to share account provisioning information of a user account of the payment card associated with the encrypted user datum and administrated by the account administrator data processing system; determining, based on the encrypted user datum, the user account of the payment card is associated with the encrypted user datum;

determining a user device associated with the user account of the payment card; authenticating a user of the payment card who is present at the payment terminal machine of the transaction data processing system; transmitting, to the user device, a message comprising a request for confirmation that the account provisioning information of the user account should be provisioned to the transaction data processing system; receiving, from the user device, a confirmation response including permission to provision to the transaction data processing system the account provisioning information of the user account; and transmitting, to the transaction data processing system, the account provisioning information of the user account.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Figure 1:
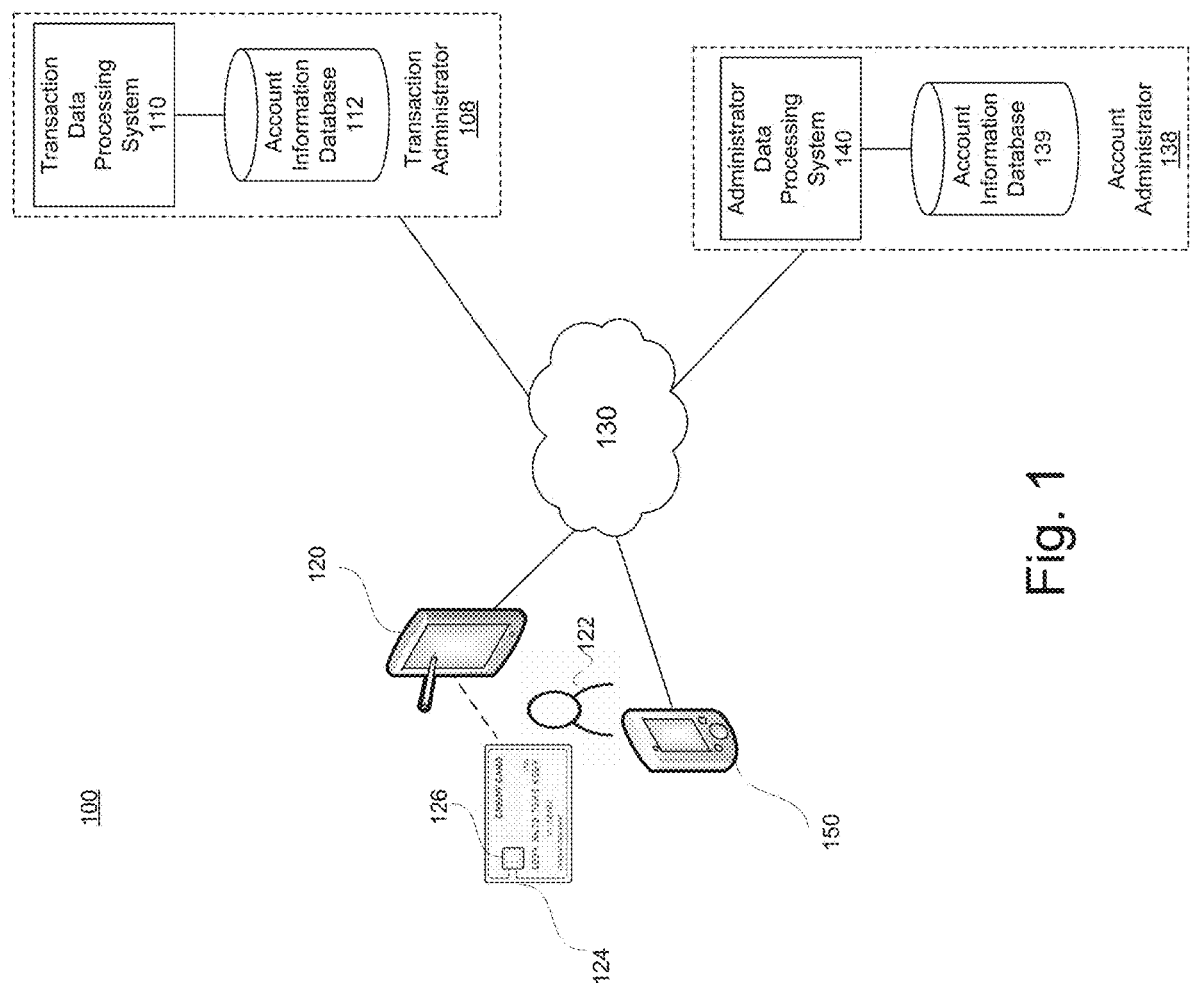
FIG. 1 is a schematic representation of a system for provisioning account information of a payment card to a transaction data processing system according to an embodiment of the invention.

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

The present invention provides automated methods and systems by which an account administrator (e.g., a bank or transaction card account administrator) can securely push account provisioning information and user data to an account processing entity (e.g., a merchant) without the need for the account holder and/or the account processing entity to manually enter required data. This is accomplished through the use of a shared encryption/hashing algorithm that allows the primary account administrator (e.g., a bank or transaction card account administrator) and partner account processing entities (e.g., merchants) to identify account holders they have in common and establish the basis for secure transmission of primary account provisioning information for a particular primary account holder from the primary account administrator to those partner entities who invite that primary account holder to set up an account with that partner entity.

One example of the present disclosure includes a card present version of push provisioning. For example, a user dips an Europay, Mastercard, and Visa (EMV) capable credit card into a point-of-sale (POS) terminal at a merchant site, and the user enters a personal identification code or number (PIN) code onto the POS terminal. The POS terminal prompts the user to share bank/user data with the merchant to set up a merchant account. The merchant calls (e.g., through an API) a bank server associated with the EMV credit card to retrieve consumer data. The bank server returns account information and payment credentials, as well as any other data the user/customer has set up to share previously, for example, email address, social profile identity, gender, age, income, credit score, etc. The merchant confirms receipt of the consumer data, and the POS terminal confirms to the customer that data share and merchant account setup is complete. The creation of the merchant account at a POS terminal may drive a subsequent discount, coupon, gift card, gift, etc. After having the merchant account established, access to the merchant account may then be provided by a link in a bank application. Alternatively, a temporary password for the merchant website might be provided in the bank application. Also a push notification might be delivered by the bank that deep links to the password setup page in the bank application. This example is a card present equivalent of retail/merchant push provisioning. Further, in this example, a pre-authorization of the credit card can be sufficient, so a transaction does not have to be run. In this way, the credit card becomes a way to acquire bank-verified (a know your customer regulatory requirement) identity. Thus, push account provisioning flow can be triggered from a verified state that exists at time of an EMV credit card transaction.

The present invention is usable for any type of account, but is of particular value for those associated with a smart card (e.g., a chip-provided identification card or transaction card). While not limited to such accounts, the invention may be of particular value in relation to card-based financial accounts. As used herein, the term financial account encompasses any account through which financial transactions may be processed. Financial accounts can include, for example, credit accounts, savings accounts, checking accounts, investment accounts, and the like.

Embodiments of the invention may be best understood with reference to FIG. 1, which illustrates an exemplary system 100 that encompasses a user device 150, an account administrator 138 (e.g., a bank) for a primary account of an account holder associated with the user device 150, a transaction administrator 108 (e.g., a merchant) and a payment terminal machine (e.g., a POS) 120 associated with the transaction administrator 108. The transaction administrator 108 comprises a transaction data processing system 110 and an account database 112 (also referred to as datastore). The account administrator 138 has an administrator data processing system 140 and an account information database (also referred to as datastore) 139. In the illustrated example, the user device 150, the transaction data processing system 110, the payment terminal machine 120, and the administrator data processing system 140 are network-enable computer systems configured to communicate with each other via a communication network 130. A user 122 may carry the user device 150 and a EMV capable credit card 124, and scan, swipe, or insert the credit card 124 on the payment terminal machine 120 to initiate a transaction with the transaction administrator. The credit card 124 may be provided with a chip 126 to enable a chip-provided identification (e.g., EMV number).

As referred to herein, a network-enabled computer system and/or device may include, but is not limited to any computer device, or communications device (or combination of such devices) including, a server, a network appliance, a personal computer (PC), a workstation, and a mobile processing device such as a smart phone, smart pad, handheld PC, personal digital assistant (PDA), or smart card (e.g., a contact-based card or a contactless card). Mobile processing devices may include Near Field Communication (NFC) capabilities, which may allow for communication with other devices by touching them together or bringing them into close proximity.

The network-enabled computer systems used to carry out the transactions contemplated in the embodiments may execute one or more software applications to, for example, receive data as input from an entity accessing the network-enabled computer system, process received data, transmit data over a network, and receive data over a network. The one or more network-enabled computer systems may also include one or more software applications to notify an account holder based on transaction information. It will be understood that the depiction in FIG. 1 is an example only, and the functions and processes described herein may be performed by any number of network-enabled computers. It will also be understood that where the system 100 may have only a single instance of certain components, multiple instances of these components may be used. The system 100 may also include other devices not depicted in FIG. 1.

The network 130 may be any form of communication network capable of enabling communication between the components of the system 100. For example, the network 130 may be one or more of a wireless network, a wired network or any combination of wireless network and wired network. The network 130 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 130 may utilize one or more protocols of one or more network elements to which it is communicatively coupled. The network 130 may translate to or from other protocols to one or more protocols of network devices. Although the network 130 is depicted as a single network, it will be appreciated that it may comprise a plurality of interconnected networks, such as, for example, the Internet, a service provider's network, a cable television network, corporate networks, and home networks.

In the example embodiments presented herein, an account holder/user/consumer may be any individual or entity having a primary account with an account administrator (e.g., a bank or primary card account processor) and, typically, one or more secondary accounts with account processing entities (e.g., merchants or other service providers) or who would like to or is asked to set up one or more secondary accounts with account processing entities. An user device 150 may be a mobile device or other processor that an account holder/user/consumer uses to carry out a transaction. An account may be held by any place, location, object, entity, or other mechanism for performing transactions in any form, including, without limitation, electronic form. An account may be a financial account or a non-financial transaction account. In various embodiments, a card-facilitated account may be a credit card account, a prepaid card account, stored value card account, debit card account, check card account, payroll card account, gift card account, prepaid credit card account, charge card account, checking account, rewards account, line of credit account, credit account, mobile device account, or mobile commerce account. In some instances, the account holder may be a transaction processing entity such as a financial institution, credit card provider, or other entity that offers accounts to customers. In some instances, the account may be a non-financial transaction account, such as a membership account, a transportation account, a loyalty account, or other account.

In some examples, procedures in accordance with the present disclosure described herein can be performed by a computer arrangement, and/or a processing arrangement (e.g., a computer hardware arrangement). Such computing and/or processing arrangement can be, for example entirely or a part of, or include, but not limited to, a computer and/or processor that can include, for example one or more microprocessors, and use instructions stored on a non-transitory computer-readable medium (e.g., RAM, ROM, hard drive, or other storage device). For example, a computer-readable medium can be part of the memory of the transaction data processing system 110, payment terminal machine 120, credit card 124, administrator data processing system 140, user device 150, and/or other computer hardware arrangement.

In some examples, a computer-readable medium (e.g., as described herein, a storage device such as a hard disk, floppy disk, memory stick, CD-ROM, RAM, ROM, etc., or a combination thereof) can be provided (e.g., in communication with the computing and/or processing arrangement). The computer-readable medium can contain executable instructions thereon. In addition or alternatively, a storage arrangement can be provided separately from the computer-readable medium, which can provide the instructions to the computing and/or processing arrangement so as to configure the computing and/or processing arrangement to execute certain exemplary procedures, processes, and methods, as described herein above, for example.

Figure 2:
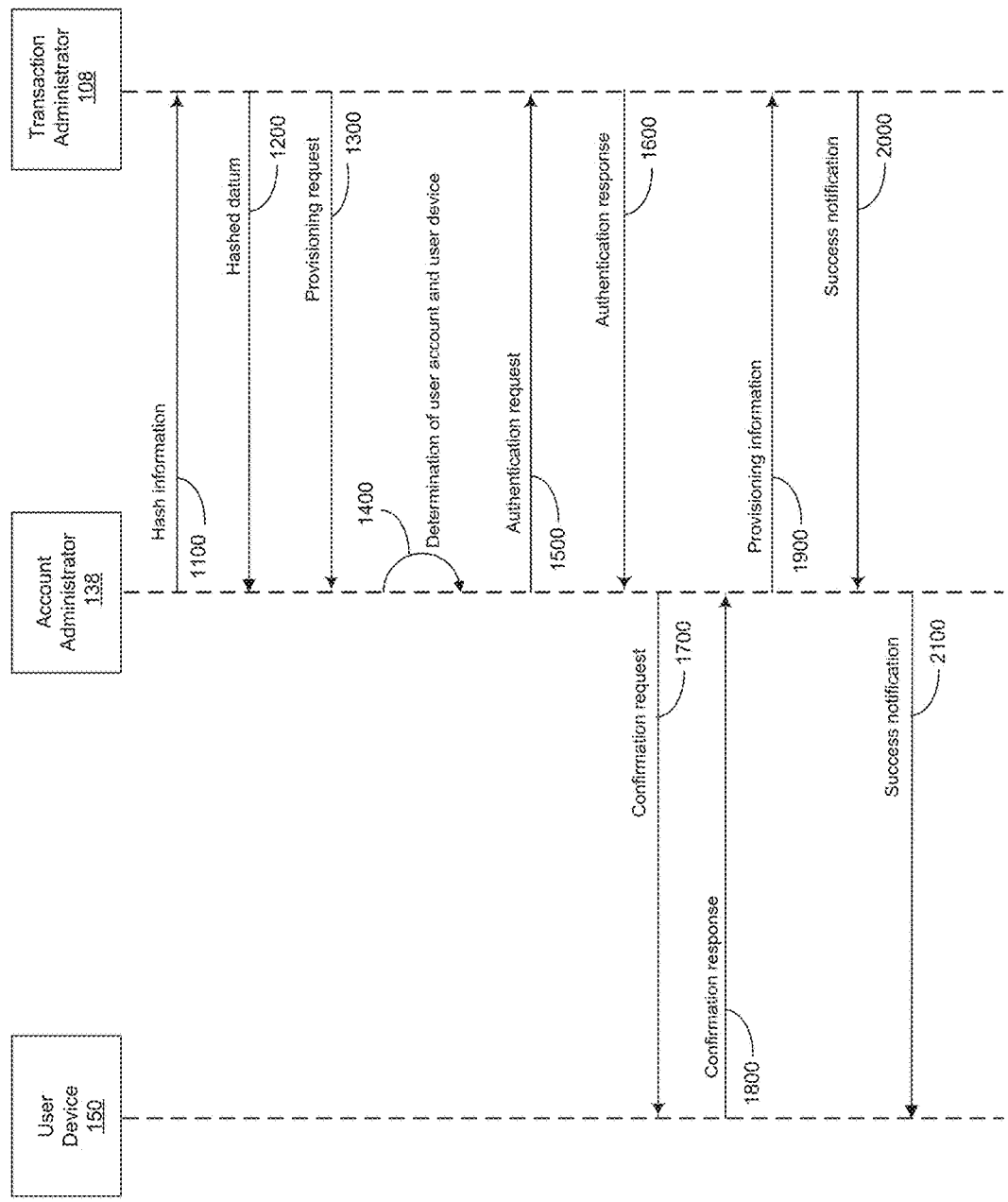
FIG. 2 illustrates a sequence of operations for automatically provisioning account information of a payment card to a transaction data processing system according to an embodiment of the invention.

The sequence diagram of FIG. 2 illustrates an exemplary application of embodiments of the invention in conjunction with the system 100 of FIG. 1. In the scenario set forth in FIG. 2, an account holder (e.g., the user 122) associated with a user device (e.g., user device 150) and a EMV credit card (e.g., the card 124) has a card account with a card account administrator (e.g., the account administrator 138). The account holder conducts a transaction with a transaction administrator at a payment terminal machine of that transaction administrator (e.g., the payment terminal machine 120 as a POS) using the EMV credit card (e.g., scanning, swiping, or inserting the card on the payment terminal machine). In this scenario, the account holder is asked by that transaction administrator (e.g., a cashier at the payment terminal machine) to or wishes to set up an merchant account with that transaction administrator and to have the account information associated with the cardholder bank account provisioned to that transaction administrator. In addition to the EMV number of the credit card received by the payment terminal machine, the account holder may also be asked to enter a personal PIN at the payment terminal machine as an optional additional layer of security, and the account holder is prompted to have her/his data sharing being requested and to allow him/her to opt in for the data sharing. At that point, that transaction administrator can retrieve the bank account data from the card account administrator. The bank account data may include bank verified data. That transaction administrator may send a receipt confirmation of the bank account data back to the card account administrator. Then that transaction administrator can create the merchant account automatically by using the provisioned bank account data. In this way, setting up the merchant account can be easier and lower friction for both the cardholder and that transaction administrator, because all it takes is for the cardholder to insert/scan/swipe the credit card at the payment terminal machine. In addition, that transaction administrator or the card account administrator can convey a link to the cardholder to download the merchant application with a temporary password so that the merchant account can be virtually activated.

Embodiments of the present invention provide an automated process by which the card account administrator can accomplish such provisioning with that partner transaction administrator who asks that cardholder to set up a merchant account. As part of this process and as shown in FIG. 2, the card account administrator 138, at 1100, securely transmits to the transaction administrator 108 unique information (also referred to as "hash information," "user datum encryption information," "datum encryption information," or "encryption information") that can be used to encrypt a predetermined piece of account holder information that is unique to the account holder and would typically be available to all of the administrators. This piece of account holder information (sometimes referred to herein as an account holder datum or user datum) may be, for example, a telephone number, email address, driver's license number, social security number, a credit card number, or employee number. The user datum encryption information may be, for example, a unique algorithm and/or encryption key values usable to create a hash of a standardized format version of the account holder datum. At the time the card account administrator 138 transmits the hash information to the transaction administrator 108, it may also specify the particular account holder datum to be used and the format it should be in prior to hashing. Once the hash information is received, the transaction administrator 108 can then use it to generate a hashed datum for each of its own account holders or to-be-account holders, which it then stores in its account holder information database (also referred to as datastore).

In the scenario of FIG. 2, the card account holder/user can scan, swipe or insert a credit card having an EMV number at a payment terminal machine associated with the transaction administrator 108. Upon receiving the EMV number by the transaction data processing system 110 of the transaction administrator 108, the transaction data processing system 110 uses the user datum encryption information to encrypt the EMV number (also referred as account holder/user datum) and, at 1200, transmits it to the administrator data processing system 140 of the account administrator 138. In response to consent of the user that the bank account information associated with the credit card will be shared with the transaction administrator, the transaction data processing system 110, at 1300, sends a provisioning request to the administrator data processing system 140. The request is received by the administrator data processing system 140 of the account administrator. In response, at 1400, the administrator data processing system 140 compares the encrypted user datum to each encrypted account holder datum in its account database (e.g., information database 139) to determine if the card account holder has an account with that account administrator. In the scenario illustrated in FIG. 2, the account administrator 138 find that they have a matching encrypted datum and, thus, have an account for the card account holder. That is, the EMV number of the credit card can be used an account identifier by the account administrator 138 to determine the account associated with that credit card. Further, the account administrator 138 may identify a user device (e.g., the user device 150) associated with the determined bank account. At 1500, the administrator data processing system 140 may transmit an authentication request to the transaction data processing system 110 to authenticate the user/cardholder. In response, the transaction data processing system 110 may direct via the payment terminal machine 120 the user to enter some credentials, such as a personal identification code or number (PIN) associated with the credit card, and/or biometric data of the user (e.g., finger prints, facial picture, voice, and the like). At 1600, the transaction data processing system 110 transmits an authentication response including the entered credentials to the administrator data processing system 140. The entered credentials may be encrypted for security, for example, by the user datum encryption information and/or any suitable encryption methods/algorithms.

Alternatively, the user may be asked to enter credentials for authentication purpose when the user scans, swipes or inserts the credit card at the payment terminal machine 120. In such case, the hashed datum at 1200 may include the credentials in addition to the EMV number.

Having received the authentication response including the entered credentials, the administrator data processing system 140 can authenticate the user based on the entered credentials. In response to a positive authentication (i.e., the user is authenticated), the administrator data processing system 140 of the card account administrator, at 1700 of the exemplary sequence of FIG. 2, transmits a confirmation request to the account holder's user device (i.e., the identified user device at 1400). The confirmation request may include a request that the account holder verify that he/she wishes to send provisioning information to the transaction administrator. In addition or instead, the confirmation request may require that the account holder provide authorization confirmation information. This may be or include any suitable information usable by the card account administrator to confirm that the user of the user device is the account holder and/or is authorized to make the provisioning request. At 1800, the user device transmits a confirmation response to the card account administrator, which uses the information in the response to establish that the transaction administrator is to receive provisioning information and/or verify authorization of the user device and user to request provisioning of the transaction administrator. In the exemplary scenario, the user using the credit card at the payment terminal machine 120 may be the account holder having the user device, or a user who is authorized by the account holder but is not having the user device. Alternatively, the user using the credit card at the payment terminal machine 120 may be a user who is authorized by the account holder and also is having the user device. At 1900, the card account administrator assembles the provisioning information and transmits it to the transaction administrator. The actual provisioning information may be any information associated with the card holder account that would be usable by the transaction administrator to draw an association between its own account for the card account holder and the card holder account. In many cases, the provisioning information may include a card identifier that can be used to facilitate a transaction and associate it with the card holder account. In addition to the EMV as an unique identifier included in the provisioning information, the provision information may also include a merchant-bound virtual card number (VCN) of the credit card, emails, phone numbers, and so forth.

After successfully provisioning the bank account information, the transaction data processing system 110 of the transaction administrator may associate the provisioning information with the merchant account of the user and store the provisioning information in the account database 112 of the transaction administrator. At 2000, the transaction data processing system 110 of the transaction administrator may transmit a success notification to the administrator data processing system 140 of the card account administrator to notify card account administrator of the successful provisioning of the bank account information. At 2100, the administrator data processing system 140 of the card account administrator may send to the user device of the bank account holder a success indicating the successful provisioning of the bank account information.

It will be understood that while FIGS. 1 and 2 illustrate one transaction administrator, the invention is not limited to any particular number of transaction administrators. The methods and systems of the invention may be used with as many transaction administrator entities as are willing to partner with the account administrator. Indeed, the value of the invention increases with the number of partner administrators involved.

Figure 3:
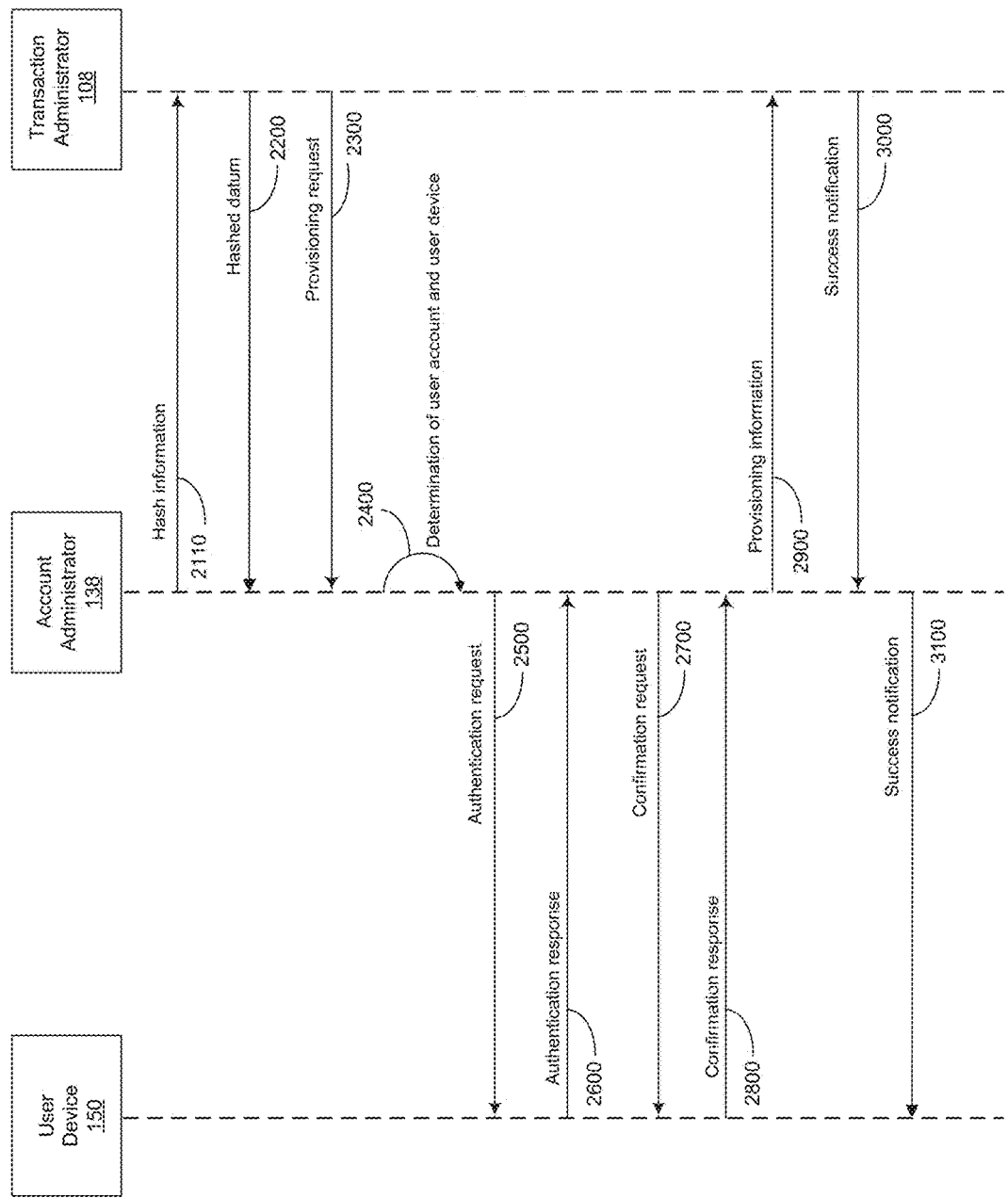
FIG. 3 illustrates a sequence of operations for provisioning account information of a payment card to a transaction data processing system according to an embodiment of the invention.

An exemplary variation on the scenario of FIG. 2 is shown in the sequence diagram of FIG. 3. In this variation, the method requires the authentication from the user device associated with the bank account holder prior to provisioning the bank account information. In the illustrated sequence, it is assumed that the card account administrator has already shared user datum hashing information with its partner transaction administrator. As in the previous example in FIG. 2, the card account administrator, at 2110, securely transmits to its partner transaction administrator unique information that can be used to encrypt a predetermined piece of account holder information that is unique to the account holder. When the card account holder/user scans, swipes or inserts a credit card having an EMV number at a payment terminal machine associated with the transaction administrator, the transaction data processing system 110 uses the hash information to encrypt the EMV number at 2200, and transmits it to the administrator data processing system 140 of the account administrator. In response to consent of the user that the bank account information associated with the credit card will be shared with the transaction administrator, the transaction data processing system 110, at 2300, sends a provisioning request to the administrator data processing system 140. In response, at 2400, the administrator data processing system 140 determines that they have a matching hashed datum and, thus, have an account for the card account holder. Further, the account administrator may identify a user device (e.g., the user device 150) associated with the determined bank account. At 2500, the administrator data processing system 140 may transmit an authentication request to the user device to authenticate the user/cardholder. The authentication request may include a text message including a one-time code. In response, the user may enter some credentials through the user device, such as the one-time code, a personal identification code or number (PIN) associated with the credit card, and/or biometric data of the user (e.g., finger prints, facial picture, voice, and the like). At 2600, the user device transmits an authentication response including the entered credentials to the administrator data processing system 140. The entered credentials may be encrypted for security, for example, by the hash information and/or any suitable encryption methods/algorithms. In some embodiments, the bank account holder may set information/data sharing preferences to give the bank account holder control of what gets shared. For example, different merchants may be allowed for sharing different levels of bank account information/data.

Having received the authentication response including the entered credentials, the administrator data processing system 140 can authenticate the user based on the entered credentials. In response to a positive authentication (i.e., the user is authenticated), the administrator data processing system 140 of the card account administrator, at 2700, transmits a confirmation request to the user device. The confirmation request may include a request that the account holder verify that he/she wishes to send provisioning information to the transaction administrator. In addition or instead, the confirmation request may require that the account holder provide authorization confirmation information. This may be or include any suitable information usable by the card account administrator to confirm that the user of the user device is the account holder and/or is authorized to make the provisioning request. At 2800, the user device transmits a confirmation response to the card account administrator, which uses the information in the response to establish that the transaction administrator is to receive provisioning information and/or verify authorization of the user device and user to request provisioning of the transaction administrator. In this exemplary scenario, the user using the credit card at the payment terminal machine 120 may be the account holder having the user device, or a user who is authorized by the account holder and also having the user device. At 2900, the card account administrator assembles the provisioning information and transmits it to the transaction administrator. The actual provisioning information may be any information associated with the card holder account that would be usable by the transaction administrator to draw an association between its own account for the card account holder and the card holder account. In many cases, the provisioning information may include a card identifier that can be used to facilitate a transaction and associate it with the card holder account. In addition to the EMV as an unique identifier included in the provisioning information, the provision information may also include a merchant-bound virtual card number (VCN) of the credit card, emails, phone numbers, and so forth.

After successfully provisioning the bank account information, the transaction data processing system 110 of the transaction administrator may associate the provisioning information with the merchant account of the user and store the provisioning information in the account database 112 of the transaction administrator. At 3000, the transaction data processing system 110 of the transaction administrator may transmit a success notification to the administrator data processing system 140 of the card account administrator to notify card account administrator of the successful provisioning of the bank account information. At 3100, the administrator data processing system 140 of the card account administrator may send to the user device of the bank account holder a success indicating the successful provisioning of the bank account information.

Details of system components usable in embodiments of the invention and, in particular, the system 100 will now be described.

Figure 4:
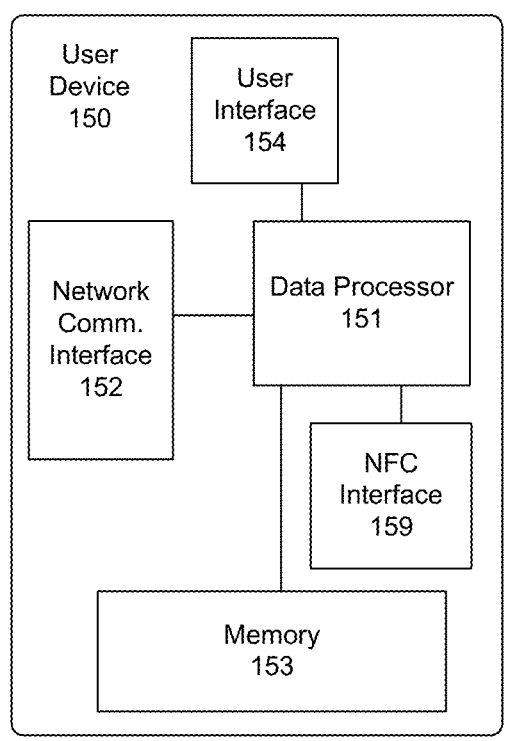
FIG. 4 is a schematic representation of a user processing device usable in embodiments of the invention.

With reference to FIG. 4, the user device 150 may be any computer device or communications device including a server, a network appliance, a personal computer (PC), a workstation, and a mobile interface device such as a smart phone, smart pad, handheld PC, or personal digital assistant (PDA). It should be understood that the description provided herein for the user device 150 is also applicable to the payment terminal machine 120, thus, description of the payment terminal machine 120 is omitted for brevity. In a particular embodiment illustrated in FIG. 4, the user device 150 includes an on-board data processor 151 in communication with a memory module 153, a user interface 154, and a network communication interface 152. The data processor 151 may include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 153 can be a read-only memory, write-once read-multiple memory or read/write memory, e.g., RAM, ROM and EEPROM, and the user device 150 can include one or more of these memories.

The user interface 154 of the device 150 includes a user input mechanism, which can be any device for entering information and instructions into the user device 150, such as a touch-screen, keyboard, mouse, cursor-control device, microphone, stylus, or digital camera. The user interface 154 may also include a display, which can be any type of device for presenting visual information such as a computer monitor, a flat panel display, and a mobile device screen, including liquid crystal displays, light-emitting diode displays, plasma panels, and cathode ray tube displays.

The network communication interface 152 is configured to establish and support wired and/or wireless data communication capability for connecting the device 150 to the network 130 or other communication network. The network communication interface 152 can also be configured to support communication with a short-range wireless communication interface, such as Bluetooth.

In some embodiments, the user device 150 may include an NFC interface 159 configured for establishing NFC communication with other NFC-equipped devices. In some of these embodiments, the NFC interface 159 may be or include an NFC receiver configured for selectively activating a magnetic field for use in establishing near field communication with an NFC transmitter. The NFC interface 159 is configured for establishing NFC communication when a passive NFC tag or other NFC-enabled device is brought into the magnetic field and within NFC communication range of the user device 150. The NFC interface 159 is configured, in particular, for communication with an NFC-enabled smart transaction card 124 when the card 124 is brought within communication range of the user device 150.

In embodiments of the invention, the memory 153 may have stored therein one or more applications usable by the data processor 151 to conduct and/or monitor transactions between the user device 150 and transaction processing devices or systems over the network 130. These applications may include instructions usable by the data processor 151 to identify transaction events, store event data in the memory 153, and communicate event data to a transaction information processing system, the administrator data processing system 140, and/or the transaction data processing system 110.

In particular embodiments, the memory 153 may include a card account application configured for carrying out transactions on a card account associated with an account holder user of the user device 150. The application may, in particular, be configured for carrying out interactive communications/transactions with the administrator data processing system 140 and, in some embodiments, the transaction data processing system 110. The application instructions may be configured for receiving, from the account holder via the user interface 154, login information for establishing authenticatable communication with the administrator data processing system 140. The login information may include an account identifier or other user identification and user authentication information.

Among other functions, the card account application installed on the user device may include instructions to receive a confirmation request from the administrator data processing system 140 over the network 130. The confirmation request may include a request that the user confirm that the user wishes to push card account information to the administrator's partner entities. In such embodiments, the application is configured to display the request on the user interface and receive a response from the user. In some embodiments, the request may identify the partner entities that have indicated they have an account for the user. In such embodiments, the request may give the user the opportunity to select a subset of the identified partner entities that the user wishes to receive card account information.

In some embodiments, the card account application may include instructions for authentication information that can be used by the administrator data processing system 140 to verify authorization of the user and/or the user device to make and confirm the provisioning request. Authentication information may include an account identifier or other user identification and user authentication information. The user authentication information may include at least one authentication credential such as a password or a scanned biometric characteristic. In some embodiments, an authentication credential may be or include information encrypted using an encryption key associated with the card account and the account holder or the user device 150.

In particular embodiments, the card account application may include instructions to require authentication information that is or includes card verification information that must be obtained from a smart card 124 associated with the cardholder account. In such embodiments, the card account application may be configured to display an instruction for the user to place the card 124 within NFC communication range of the user device 150. The application may be further configured to cause the data processor 151 to transmit, via the NFC interface 159, an authorization query to the card 124 and to receive a query response from the card 124. In some embodiments, the card may be configured to automatically transmit verification information upon being brought within NFC communication range. In such embodiments, an explicit query by the user device 150 to the card 124 may be unnecessary.

The card account application may be further configured to instruct the data processor 151 to construct a confirmation response including confirmation and/or authentication/verification information and to transmit the response to the administrator data processing system 140 via the network communication interface 152 and the network 130. The application may also be configured to receive and display a provisioning completion message from the administrator data processing system 140.

The transaction card 124 may be any chip-carrying transaction card ("smart" card) having electrical and/or near field or other short range communication capabilities. A typical transaction card 124 that is usable in various embodiments of the invention is a smart card with a microprocessor chip 126. The microprocessor chip 126 includes processing circuitry for storing and processing information, including a microprocessor and a memory. It will be understood that the processing circuitry may contain additional components, including processors, memories, error and parity/CRC checkers, data encoders, anticollision algorithms, controllers, command decoders, security primitives and tamper-proofing hardware, as necessary to perform the functions described herein.

The transaction card 124 may be configured for communication with transaction terminals and other devices via a communication interface configured for establishing communication with transaction processing devices. The communication interface may be configured for contact-based communication, in which case the interface may have electrical circuitry and contact pads on the surface of the card 124 for establishing direct electrical communication between the microprocessor and the processing circuitry of a transaction terminal. Alternatively or in addition, the communication interface may be configured for contactless communication with a transaction terminal or other wireless device. In such embodiments, the communication interface may be or include an NFC communication interface configured for communication with other NFC communication devices when the card 124 is within a predetermined NFC range. The communication interface and the microprocessor may, in particular, be configured for establishing NFC communication with the payment terminal machine 120 and/or the user device 150. In some embodiments, the microprocessor chip 126 may include a second communication interface configured for establishing short range communication with the payment terminal machine 120 and/or the user device 150 via Bluetooth, or other short range communication methodology. In such embodiments, the transaction card chip 126 may have a short range communication antenna that is included in or connected to the short range communication interface. The microprocessor chip 126 may also include a power management system for use in managing the distribution of power during an NFC transaction.

The memory may be a read-only memory, write-once read-multiple memory or read/write memory, e.g., RAM, ROM, and EEPROM, and the chip 126 may include one or more of these memories. The memory may have stored therein information associated with a transaction card account. In some embodiments, the memory may have permanently stored therein a unique alphanumeric identifier associated with the account. It may also have stored public and private card encryption keys. In some embodiments, the private and public encryption keys may be permanently hard-wired into the card memory.

The card memory may be configured to store one or more software applications for execution by the microprocessor. In various embodiments, the memory may have stored therein instructions for generating encrypted information and transmitting it to a receiving device (e.g., the payment terminal machine 120 and/or the user device 150). Such encrypted information may be or include an encrypted verification block or signature that may be used to authenticate and verify the presence of the transaction card 124 during transaction processing. In some embodiments, encrypted information be unique to a particular communication (e.g., a particular NFC transmission by the transaction card).

The transaction data processing system 110 of the transaction administrator is a network-enabled data processing system that is configured for management and control of account-related transactions for a plurality of user accounts. The transaction data processing system 110 may be configured for communication with a plurality of user device 150 and the payment terminal machine 120 via the network 130 for establishing interactive communication sessions with account holders. The transaction data processing system 110 may also be configured for communication with other entities via the network including the account administrator data processing system 140. The processing system 110 may be configured, in particular, to receive hashing information from the administrator data processing system 140 and to use this information to encrypt a standard, formatted account holder datum for each account holder of their respective administrator entities. The hashed datum for each account holder may then be stored with other account holder information in an account database 112. The transaction data processing system 110 may also be configured to receive a subsequent user account query from the administrator data processing system 140 via the network 130. The transaction data processing system 110 may be configured to receive transaction information (e.g., credit card information including EMV, cardholder name, expiration date, PIN, etc.) from the payment terminal machine 120, and/or transmit to the payment terminal machine 120 user authentication request when a user of the credit card interacts with the payment terminal machine 120. The authentication request may be displayed on the payment terminal machine to ask the user to enter credentials, such as, PIN, passcode, answers to security questions, and the like.

The account information in the account database 112 may include information on the account holder as well as information on accounts with other administrators. Account holder information may include contact information (mailing address, email address, phone numbers, etc.), reward points, coupons, promotional codes, and user preferences. It may also include information for a primary account (e.g., a bank or other cardholder administrator) for use in certain transactions related to the account with that administrator entity. The transaction data processing system 110 may be configured to receive primary account provisioning information for an account holder from the administrator data processing system 140 and store it in the account database 112.

In particular embodiments, the transaction administrator may be merchants whose transaction data processing system 110 are configured to carry out merchant transactions via the associated payment terminal machine 120. In some of these embodiments, the user account administered by the account administrator is a contactless transaction card account, and the account provisioning information includes contactless card account information for use in carrying out merchant account holder transactions processed by the transaction data processing system 110.

Figure 5:
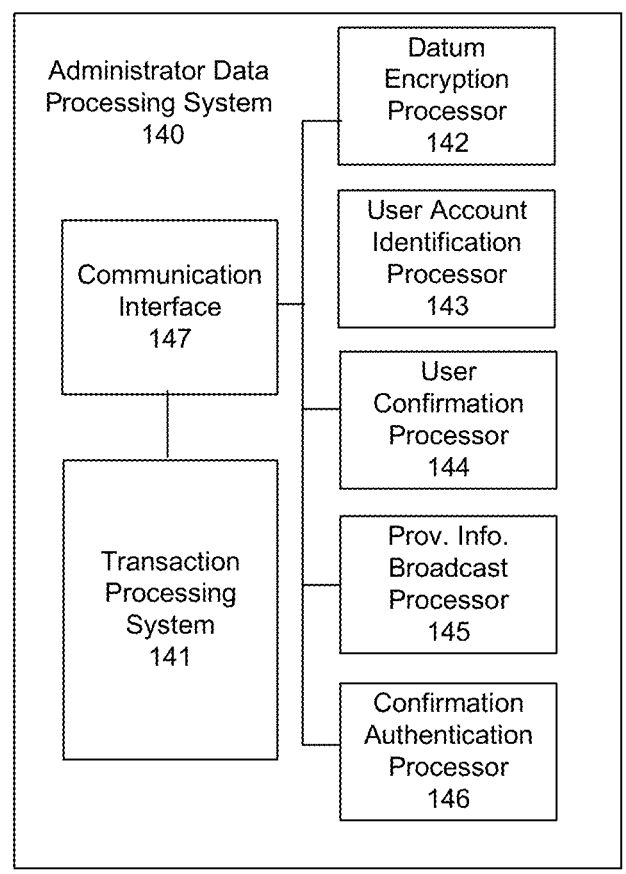
FIG. 5 is a schematic representation of a card account administrator data processing system according to an embodiment of the invention.

With reference to FIG. 5, the administrator data processing system 140 may include a communication interface 147 configured for establishing communication with one or more networks including the network 130, and, via the one or more networks, the user device 150 and one or more transaction data processing systems 110. The administrator data processing system 140 includes a transaction processing system 141 configured to communicate with a plurality of user device 150 and with other transaction processing systems via the network 130 and the communication interface 147. The transaction processing system 141 may be configured for receiving and processing card account and transaction information. In particular embodiments, this may include, for example, processing financial transactions related to financial transaction card accounts.

The administrator data processing system 140 may further include a datum encryption processor 142, a user account identification processor 143, a user confirmation processor 144, and a provisioning information broadcast processor 145. In some embodiments, the system 140 may also include a confirmation authentication processor 146. Any or all of these processors may be configured to communicate over the network 130 via the communication interface 147.

The datum encryption processor 142 may be configured to generate user datum encryption information adapted for encrypting a particular card account holder datum. The card account holder datum may be a typical piece of account holder information that is unique to the card account holder and would typically be known or available to any account administrator with whom the card account holder may have an account. The card account holder datum could be, for example, a telephone number, email address, driver's license number, or employee number. The encryption information may be, for example, a unique algorithm and/or values usable to create a hash of a standardized format version of the card account holder datum. The datum encryption processor 142 may also be configured to transmit, via the network 130, the user datum encryption information to any or all of a plurality of transaction data processing system 110 managed by transaction administrator entities that have agreed to partner with the card account administrator. At the time the datum encryption processor 142 transmits the encryption information to the transaction data processing system 110, it may also specify the particular account holder datum to be used and the format it should be in prior to encrypting.

The user account identification processor 143 may be configured to receive, over a first network (e.g., network 130) from a payment terminal machine 120, credit card information (e.g., EMV) associated with a card account holder having an account with the card account administrator. The credit card information may include information identifying a merchant, the account holder, an account identifier, and/or a card identifier for a transaction card associated with the account. In some embodiments, the credit card information may identify one or more specific transaction processing entities with which the user is performing transactions. The credit card information may be or include any information associated with the card holder account that would be usable by the transaction administrators to draw an association between their own accounts for the card account holder and the card holder account. In particular embodiments, the credit card information may include a card identifier or card account identifier that can be used to facilitate a transaction and associate it with the card holder account. The user account identification data processor 143 may be further configured to encrypt a user datum associated with the account holder using the user datum encryption information. The user datum would be drawn from the account holder information stored in the card holder account information database 139. It would be selected and formatted so as to match the datum specifications provided to the transaction data processing system 110.

The user account identification processor 143 may be further configured to transmit, over a second network (which may be the same as the first network) to the transaction data processing system 110, a user account query including the encrypted user datum. The processor 143 may also be configured to receive, over the second network, responses from the transaction data processing system 110. In some embodiments, each response may include an indication that the transaction administrator associated with the transaction data processing system 110 has or does not have its own account for the card account holder.

The user confirmation processor 144 may be configured to transmit to the user device 150 over the first network, a message including a request for confirmation that the account provisioning information should be shared. The message may include identification of the account administrator data processing system 140 (and/or its associated administrator entity) identified by the user account identification processor 143. The user confirmation processor 144 may be further configured to receive from the user device 150, a confirmation response. This response may include permission to share account provisioning information. In some embodiments, the response may indicate that the provisioning information should include only a subset of the card account information for the card holder account.

The provisioning information broadcast processor 145 may be configured to retrieve card account information for the card holder account from the account information database 139 and assemble it for transmission to the transaction data processing system 110. Typical account holder information could include name, email address, physical address, phone number, employer, social security number or other unique identifier, etc. In some embodiments, the provisioning information may be assembled into a single standard format for all of the different account administrators. In other embodiments, the format may be tailored to each administrator to meet requirements of that transaction data processing system 110 and/or account database 112. The provisioning information broadcast processor 145 may also be configured to transmit, over the second network, the account provisioning information to the transaction data processing system 110.

As noted above, the administrator data processing system 140 may also include a confirmation authentication processor 146. The confirmation authentication processor 146 may be a separate processor as illustrated in FIG. 5. Alternatively, the functions of the confirmation authentication processor 146 may be combined with those of the user confirmation processor 144. The confirmation authentication processor 146 may be configured to transmit a confirmation authentication request to the user device 150 over the first network and/or the transaction data processing system 110 over the second network. In some embodiments, this request may be combined with the confirmation request. In other embodiments, the confirmation authentication request may be transmitted in response to the user confirmation processor 144 receiving a confirmation response including permission to share account provisioning information.

The confirmation authentication request may include a request for authentication information that can be used by the confirmation authentication processor 146 to verify authorization of the user and/or the user device 150 to make and confirm the provisioning request. Authentication information may include an account identifier or other user identification and user authentication information. The user authentication information may include at least one authentication credential such as a password or a scanned biometric characteristic that may be used as part of a multi-factor authentication methodology. In some embodiments, an authentication credential may be or include information encrypted using an encryption key associated with the card account and the account holder or the user device 150 or the transaction administrator. In particular embodiments, the confirmation request may require an authentication credential that is or includes card verification information that must be obtained from a smart card 124 associated with the cardholder account.

The confirmation authentication processor 146 may be configured to receive authentication information from the user device 150 over the first network and/or the transaction data processing system 110 over the second network. The confirmation authentication processor 146 may then use authentication credentials from the authentication information and information from the card account information database 139 to authenticate the confirmation response. This may be accomplished using any of various known authentication processes associated with particular credentials. In embodiments where encrypted card verification information is received, the authentication processor 146 may be configured to retrieve encryption information from the card account information database 139 and use it to decrypt the card-encrypted information. Successful decryption may be used as a positive indication that the card user at the provisioning requester (e.g., the payment terminal machine 120 of the transaction administrator) is in possession of the transaction card 124 for the card account.

It will be understood that, in embodiments having a confirmation authentication processor 146, the provisioning information broadcast processor 145 may be configured to transmit account provisioning information only after the confirmation authentication processor has established a positive authentication for the user, user device, and/or confirmation response. It will also be understood that the datum encryption processor 142, the user account identification processor 143, the user confirmation processor 144, the provisioning information broadcast processor 145, and the confirmation authentication processor 146 may be combined into a single processor to perform all the functions of the above processors, or may be combined into multiple other processors to perform all the functions of the above processors.

Figure 6:
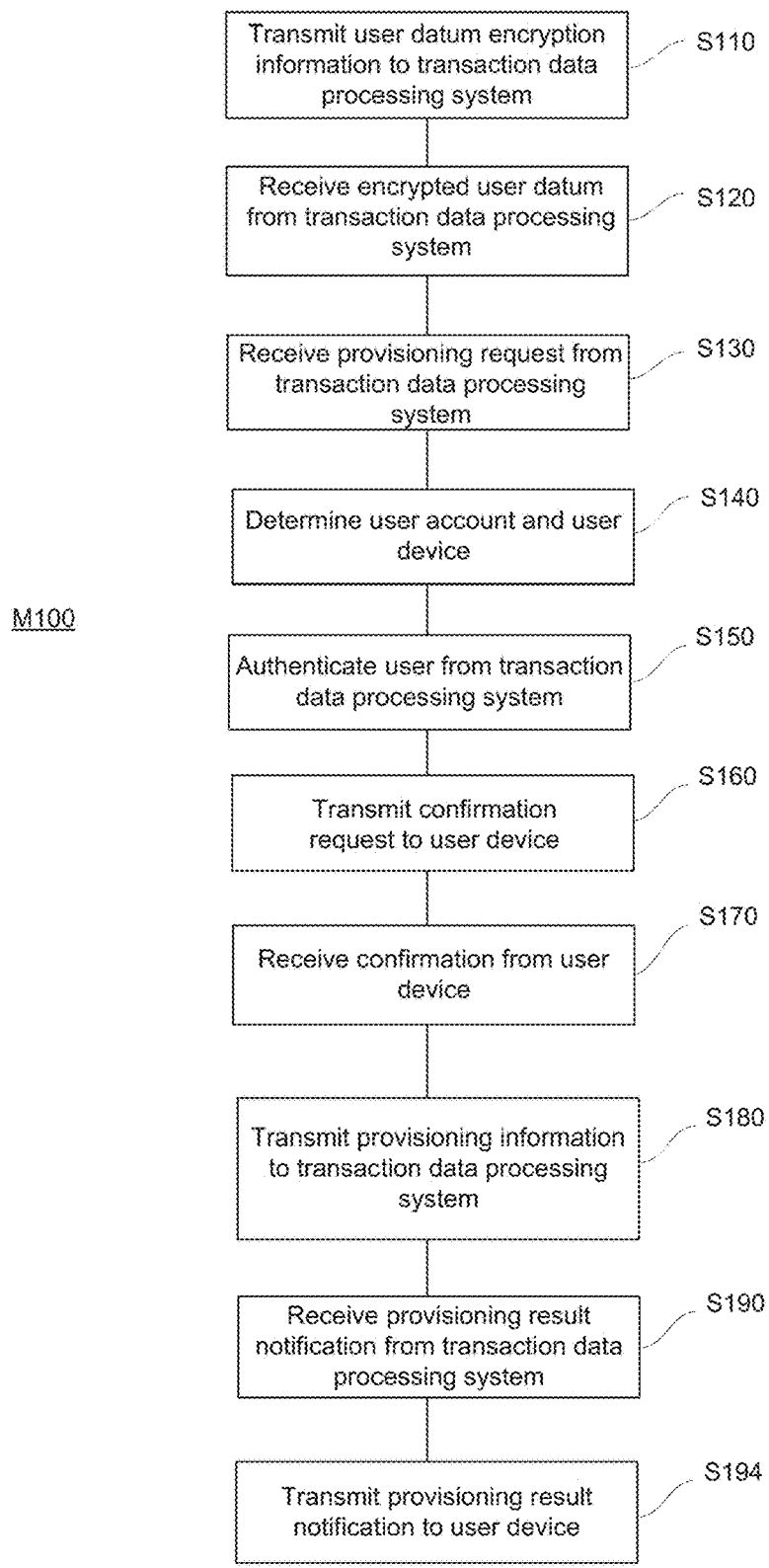
FIG. 6 is a flow diagram illustrating a method of provisioning account information of a payment card to a transaction data processing system according to an embodiment of the invention.

FIG. 6 illustrates an exemplary method M100 for provisioning account information of a payment card to a transaction data processing system. The actions of the method M100 may typically be carried out by an account administrator data processing system such as the administrator data processing system 140 of the system 100 depicted in FIG. 1. As previously described, the administrator data processing system may be configured for managing a plurality of accounts, which may be transaction card or other primary accounts. Each of these accounts may have one or more unique identifiers, an associated account holder, and stored account holder information. Prior to or as part of the method M100, the account administrator data processing system may generate user datum encryption information adapted for encrypting a particular account holder datum as described above. At S110 of the method M100 the administrator data processing system may transmit the user datum encryption information to a transaction data processing system associated with a partner transaction administrator. At S120, the administrator data processing system receives from a payment terminal machine of the transaction data processing system, a user datum encrypted by the transaction data processing system using the user datum encryption information. The user datum is obtained through reading the payment card by the payment terminal machine, for example, scanning, inserting or swiping the payment card on the payment terminal machine. At S130, when the user of the payment card opts in to set up a merchant account with the transaction administrator, the administrator data processing system receives from the payment terminal machine of the transaction data processing system, a request to share account provisioning information of a user account of the payment card associated with the encrypted user datum and administrated by the account administrator data processing system. At S140, the administrator data processing system determines, based on the encrypted user datum, the user account of the payment card is associated with the encrypted user datum. For example, the administrator data processing system may compare the encrypted user datum with encrypted user data stored in the account information database 139 to find a match. The administrator data processing system may also determine a user device associated with the user account of the payment card. At S150, the administrator data processing system authenticates from the transaction data processing system (the payment terminal machine) the user of the payment card who is present at the payment terminal machine of the transaction data processing system. For example, the user of the payment card may be asked to enter a PIN, a passcode, a password, a biometric datum, etc. through the payment terminal machine. At S160, the account administrator data processing system transmits to the account holder's user device a message comprising a request for confirmation that the account provisioning information should be provisioned to the transaction data processing system. In some embodiments, the message may include the transaction data processing system and/or its associated administrators. At S170, the administrator data processing system receives from the user device a confirmation response including permission to provision the transaction data processing system with the account provisioning information of the user account. In some embodiments, this response may include limitations on the provisioning information to be shared. At S180, the administrator data processing system transmits the account provisioning information to the transaction data processing system. At S190, the account administrator data processing system receives from the transaction data processing system, a notification indicating a successful provision result. At S194, the account administrator data processing system transmits to the user device, a message indicating that the account provisioning information has been successfully provisioned on the transaction data processing system of the transaction administrator.

Figure 7:
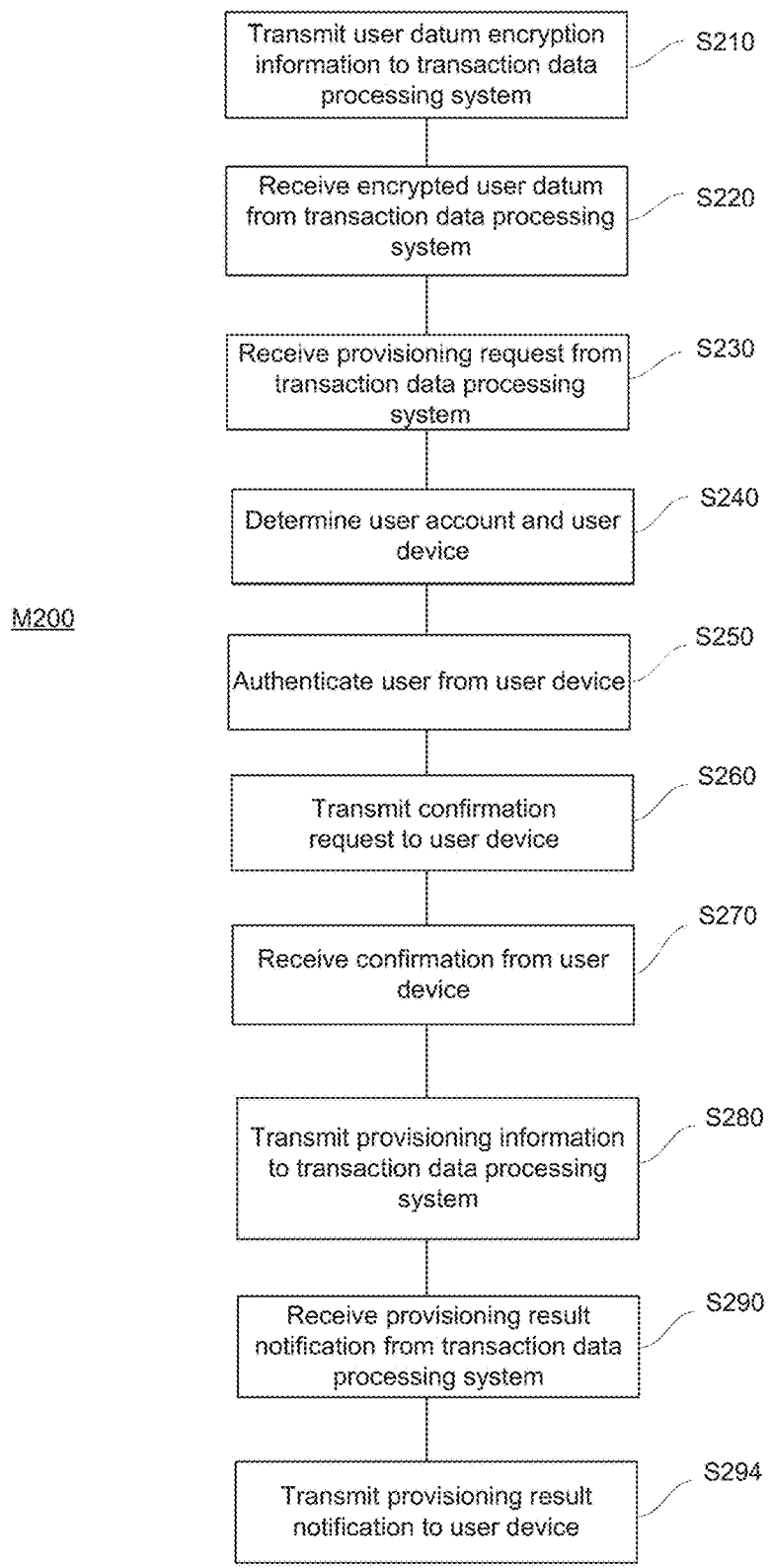
FIG. 7 is a flow diagram illustrating a method of provisioning account information of a payment card to a transaction data processing system according to an embodiment of the invention.

FIG. 7 illustrates another exemplary method M200 for provisioning account information of a payment card to a transaction data processing system. As in the previous example, the actions of the method M200 may be carried out by an account administrator data processing system such as the administrator data processing system 140 of the system 100 depicted in FIG. 1. As in the previous method, the account administrator data processing system may generate user datum encryption information adapted for encrypting a particular account holder datum as described above. At S210 of the method M200, the administrator data processing system may transmit the user datum encryption information to a transaction data processing system associated with a partner transaction administrator. At S220, the administrator data processing system receives from a payment terminal machine of the transaction data processing system, a user datum encrypted by the transaction data processing system using the user datum encryption information. The user datum is obtained through reading the payment card by the payment terminal machine, for example, scanning, inserting or swiping the payment card on the payment terminal machine. At S230, when the user of the payment card opts in to set up a merchant account with the transaction administrator, the administrator data processing system receives from the payment terminal machine of the transaction data processing system, a request to share account provisioning information of a user account of the payment card associated with the encrypted user datum and administrated by the account administrator data processing system. At S240, the administrator data processing system determines, based on the encrypted user datum, the user account of the payment card is associated with the encrypted user datum. For example, the administrator data processing system may compare the encrypted user datum with encrypted user data stored in the account information database 139 to find a match. The administrator data processing system may also determine a user device associated with the user account of the payment card. At S250, the administrator data processing system authenticates from the user device the user of the payment card who is present at the payment terminal machine of the transaction data processing system. For example, the administrator data processing system may send to the user device a text message including a one-time code and ask the user to enter the one-time code, the administrator data processing system may require the user to call a specific phone number from the user device, the administrator data processing system may require the user to login to the credit card account from the user device, and/or the administrator data processing system may ask the user to enter a PIN, a passcode, a password, a biometric datum, etc. through the user device. At S260, the account administrator data processing system transmits to the user device a message comprising a request for confirmation that the account provisioning information should be provisioned to the transaction data processing system. In some embodiments, the message may include the transaction data processing system and/or its associated administrators. At S270, the administrator data processing system receives from the user device a confirmation response including permission to provision the transaction data processing system with the account provisioning information of the user account. In some embodiments, this response may include limitations on the provisioning information to be shared. At S280, the administrator data processing system transmits the account provisioning information to the transaction data processing system. At S290, the account administrator data processing system receives from the transaction data processing system, a notification indicating a successful provision result. At S294, the account administrator data processing system transmits to the user device, a message indicating that the account provisioning information has been successfully provisioned on the transaction data processing system of the transaction administrator.

In some embodiments, the step of determining, by the account administrator data processing system, the user account of the payment card is associated with the encrypted user datum, may comprise comparing the encrypted user datum with encrypted user data stored in a datastore of the account administrator data processing system.

In some embodiments, the step of authenticating, by the account administrator data processing system, a user of the payment card who is present at the payment terminal machine of the transaction data processing system, may comprise: transmitting, by the account administrator data processing system to the payment terminal machine of the transaction data processing system, an authentication request; receiving, by the account administrator data processing system from the payment terminal machine of the transaction data processing system, at least one authentication credential entered by the user; and authenticating the user by the account administrator data processing system using the at least one authentication credential and a predetermined authentication process. The at least one credential includes one or more of a personal identification number, a biometric datum of the user, a security code included in the authentication request wherein the user carries the user device and the authentication request is sent to the user device, or an answer to a security question included in the authentication request. The action of transmitting the account provisioning information is carried out only in response to a positive authentication of the user.

In some embodiments, the step of authenticating, by the account administrator data processing system, a user of the payment card who is present at the payment terminal machine of the transaction data processing system, may comprise: transmitting, by the account administrator data processing system to the user device, an authentication request; receiving, by the account administrator data processing system from the user device, at least one authentication credential entered by the user; and authenticating the user by the account administrator data processing system using the at least one authentication credential and a predetermined authentication process. The at least one credential includes one or more of a personal identification number, a biometric datum of the user, a security code included in the authentication request, or an answer to a security question included in the authentication request. The action of transmitting the account provisioning information is carried out only in response to a positive authentication of the user.

In some embodiments, the user datum may include an Europay, Mastercard, and Visa (EMV) number of the payment card. The payment terminal machine can be a point of sale (POS) machine. The step of reading the payment card by the payment terminal machine may include one of inserting by the user the payment card into the payment terminal machine, swiping by the user the payment card into the payment terminal machine, or scanning the payment card by the payment terminal machine. The account provisioning information may include at least one of a home address, a billing address, a mobile phone number, a home phone number, an email address, a 16-digit credit card number, a 16-digit virtual card number, or a credit card expiration date.

The present invention provides automated methods by which an account administrator can securely push account provisioning information and user data to a transaction administrator entity without the need for the account holder and the transaction administrator entity to manually enter the account information. This is accomplished through the use of a shared encryption/hashing algorithm and/or unique encryption keys, which allows the primary account administrator and partner account processing entities to identify account holders they have in common without sharing account information. This establishes the basis for secure transmission of primary account provisioning information for a particular primary account holder from the primary account administrator to those partner entities also having an account for that primary account holder and/or inviting that primary account holder to set up merchant accounts with the partner entities. This greatly improves the security and efficiency of the sharing operation as well as the convenience to the account holder.

In the present disclosure, automatically setting up a merchant account with a partner transaction data administrator can allow for customers to perform ecommerce transactions and/or subscription transactions with that transaction data administrator without presenting a payment card. For example, subsequent POS checkouts may just need a phone number, a photo ID, a PIN, a reply to a message pushed to the user device, and/or a biometric datum of the customer. It would allow for that transaction data administrator to market its products and drive customer loyalty afterwards efficiently and effectively and also allow for creating better customer experiences.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

What is claimed is:

1. A method for provisioning account information of a payment card by an administrator data processing system to a transaction data processing system, the method comprising:

transmitting, by the payment card to a payment terminal machine of the transaction data processing system via a near field communication (NFC) field, a user datum;

transmitting, via a first network, by the administrator data processing system to the transaction data processing system, user datum encryption information;

receiving, via the first network, by the administrator data processing system from the payment terminal machine of the transaction data processing system, the user datum encrypted by the transaction data processing system using the user datum encryption information;

receiving, via the first network by the administrator data processing system from the payment terminal machine of the transaction data processing system, a request to share account provisioning information of a user account of the payment card associated with the encrypted user datum and administrated by the administrator data processing system;

determining, by the administrator data processing system based on the encrypted user datum, the user account of the payment card is associated with the encrypted user datum;

determining, by the administrator data processing system, a user device associated with the user account of the payment card;

authenticating, by the administrator data processing system, a user of the payment card;

transmitting, via a second network by the administrator data processing system to the user device, a message comprising a request for confirmation that the account provisioning information of the user account be provisioned to the transaction data processing system;

receiving, via the second network by the administrator data processing system from the user device, a confirmation response including permission to provision to the transaction data processing system the account provisioning information of the user account; and transmitting, via the first network by the administrator data processing system to the transaction data processing system, the account provisioning information of the user account.

2. The method according to claim 1, wherein the action of determining, by the administrator data processing system, the user account of the payment card is associated with the encrypted user datum, comprises comparing the encrypted user datum with encrypted user data stored in a datastore of the administrator data processing system.

3. The method according to claim 1, wherein the action of authenticating, by the administrator data processing system, a user of the payment card who is present at the payment terminal machine of the transaction data processing system, comprises:

transmitting, by the administrator data processing system to the payment terminal machine of the transaction data processing system, an authentication request, receiving, by the administrator data processing system from the payment terminal machine of the transaction data processing system, at least one authentication credential entered by the user, and authenticating the user by the administrator data processing system using the at least one authentication credential and a predetermined authentication process.

4. The method according to claim 3, wherein the at least one credential includes one or more of a personal identification number, a biometric datum of the user, a security code included in the authentication request wherein the user carries the user device and the authentication request is sent to the user device, or an answer to a security question included in the authentication request.

5. The method according to claim 1, wherein the action of authenticating, by the administrator data processing system, a user of the payment card who is present at the payment terminal machine of the transaction data processing system, comprises:
   transmitting, by the administrator data processing system to the user device, an authentication request,
   receiving, by the administrator data processing system from the user device, at least one authentication credential entered by the user, and
   authenticating the user by the administrator data processing system using the at least one authentication credential and a predetermined authentication process,
   wherein the action of transmitting the account provisioning information is carried out only in response to a positive authentication of the user.

6. The method according to claim 5, wherein the at least one credential includes one or more of a personal identification number, a biometric datum of the user, a security code included in the authentication request, or an answer to a security question included in the authentication request.

7. The method according to claim 1, wherein the user datum include a credit card number of the payment card.

8. The method according to claim 1, wherein the payment terminal machine is a point of sale (POS) machine.

9. The method according to claim 1, wherein the account provisioning information includes at least one of a home address, a billing address, a mobile phone number, a home phone number, an email address, a 16-digit credit card number, a 16-digit virtual card number, or a credit card expiration date.

10. The method according to claim 1, further comprising receiving, by the administrator data processing system from the transaction data processing system, a message indicating that the account provisioning information has been provisioned successfully to the transaction data processing system.

11. The method according to claim 10, further comprising transmitting, by the administrator data processing system to the user device, a message indicating that the account provisioning information has been provisioned successfully to the transaction data processing system.

12. An administrator data processing system for provisioning account information of a payment card to a transaction data processing system, comprising:
   at least one processor; and
   a memory storing instructions, when executed by the at least one processor, cause the at least one processor to perform operations comprising:
      generating user datum encryption information,
      receiving, over a first network from a payment terminal machine of the transaction data processing system, an encrypted user datum encrypted by the transaction data processing system using the user datum encryption information, wherein the encrypted user datum is encrypted based on a user datum received by the payment terminal machine from the payment card via a near field communication (NFC) field,
      receiving, over the first network from the payment terminal machine of the transaction data processing system, a request to share account provisioning information of a user account of the payment card associated with the encrypted user datum,
      determining, based on the encrypted user datum, the user account of the payment card is associated with the encrypted user datum,
      determining a user device associated with the user account of the payment card,
      authenticating a user of the payment card,
      transmit transmitting, over a second network to the user device, a message comprising a request for confirmation that the account provisioning information of the user account be provisioned to the transaction data processing system,
      receiving, over the second network from the user device, a confirmation response including permission to provision to the transaction data processing system the account provisioning information of the user account, and
      transmitting, over the first network, the account provisioning information of the user account.

13. The administrator data processing system according to claim 12, wherein the instructions, when executed by the at least one processor, cause the at least one processor to perform further operations comprising:
   transmitting, over the first network to the payment terminal machine of the transaction data processing system, an authentication request,
   receiving, over the first network from the payment terminal machine of the transaction data processing system, at least one authentication credential entered by the user, and
   authenticating the user using the at least one authentication credential and a predetermined authentication process.

14. The system according to claim 12, wherein the instructions, when executed by the at least one processor, cause the at least one processor to perform further operations comprising:
   transmitting, over the second network to the user device, an authentication request,
   receiving, over the second network from the user device, at least one authentication credential entered by the user, and
   authenticating the user using the at least one authentication credential and a predetermined authentication process,
   wherein the action of transmitting the account provisioning information is carried out only in response to a positive authentication of the user.

15. The system according to claim 14, wherein the at least one credential includes one or more of a personal identification number, a biometric datum of the user, a security code included in the authentication request, or an answer to a security question included in the authentication request.

16. The system according to claim 12, wherein the account provisioning information includes at least one of a home address, a billing address, a mobile phone number, a home phone number, an email address, a 16-digit credit card number, a 16-digit virtual card number, or a credit card expiration date.

17. The system according to claim 12, wherein the instructions, when executed by the at least one processor, cause the at least one processor to perform further operations comprising receiving, over the first network from the transaction data processing system, a message indicating that the account provisioning information has been provisioned successfully to the transaction data processing system.

18. The system according to claim 12, wherein the instructions, when executed by the at least one processor, cause the at least one processor to perform further operations comprising transmitting, over the second network to the user device, a message indicating that the account provisioning information has been provisioned successfully to the transaction data processing system.

19. A non-transitory, computer readable medium comprising instructions for provisioning account information of a payment card to a transaction data processing system that, when executed on an administrator data processing system, cause the administrator data processing system to perform actions comprising:
- causing the payment card to transmit, via a near field communication (NFC) field to a payment terminal machine of the transaction data processing system, a user datum;
- transmitting, via a first network to the transaction data processing system, user datum encryption information;
- receiving, via the first network from the payment terminal machine of the transaction data processing system, the user datum encrypted by the transaction data processing system using the user datum encryption information;
- receiving, via the first network from the payment terminal machine of the transaction data processing system, a request to share account provisioning information of a user account of the payment card associated with the encrypted user datum and administrated by the administrator data processing system;
- determining, based on the encrypted user datum, the user account of the payment card is associated with the encrypted user datum;
- determining a user device associated with the user account of the payment card;
- authenticating a user of the payment card;
- transmitting, via a second network to the user device, a message comprising a request for confirmation that the account provisioning information of the user account be provisioned to the transaction data processing system;
- receiving, via the second network from the user device, a confirmation response including permission to provision to the transaction data processing system the account provisioning information of the user account; and
- transmitting, via the first network to the transaction data processing system, the account provisioning information of the user account.

20. The non-transitory, computer readable medium to claim 19, wherein the action of authenticating a user of the payment card, comprises:
- transmitting to the user device, an authentication request,
- receiving from the user device, at least one authentication credential entered by the user, and
- authenticating the user using the at least one authentication credential and a predetermined authentication process,
- wherein the action of transmitting, via the first network to the transaction data processing system, the account provisioning information of the user account, is carried out only in response to a positive authentication of the user.

* * * * *